United States Patent

[11] 3,588,001

[72] Inventor James I. Mitchell
 River Edge, N.J.
[21] Appl. No. 796,663
[22] Filed Feb. 5, 1969
[45] Patented June 28, 1971
[73] Assignee The Bendix Corporation

[54] SHOCK-ABSORBING MEANS FOR A FREE PENDULOUS MAGNETIC AZIMUTH DETECTOR MECHANISM
13 Claims, 3 Drawing Figs.

[52] U.S. Cl. .................................................. 244/1,
 33/223, 74/5.42, 188/1, 248/284, 188/102,
 248/358, 267/1
[51] Int. Cl. .................................................. B64d 43/00
[50] Field of Search ........................................ 73/(Inquired);
 188/(Inquired); 248/179, 180, 184,
 324, 325, 358, 284, (Inquired); 58/129,
 (Inquired); 267/(Inquired); 33/223, 225, 222,
 (Inquired); 74/5, 5.42, (Inquired); 244/1, 1.3

[56] References Cited
UNITED STATES PATENTS

| | | | |
|---|---|---|---|
| 2,300,685 | 11/1942 | McKay | 33/223 |
| 2,852,859 | 9/1958 | Depp | 33/225 |
| 3,319,918 | 5/1967 | Rapata | 248/358X |
| 3,392,953 | 7/1968 | Ciringione et al. | 248/358 |

Primary Examiner—Milton Buchler
Assistant Examiner—Jeffrey L. Forman
Attorneys—Herbert L. Davis and Plante, Arens, Hartz, Hix & Smith ABSTRACT: A shock-absorbing means for a free pendulous magnetic azimuth detector mechanism in which a stop carried by a base member serves to limit the motion of the free pendulous mechanism while novel resilient means cooperatively arranged between the pendulous mechanism and the base member provides a viscous damping and rapid spring return in a low-volume, high-energy absorbing package.

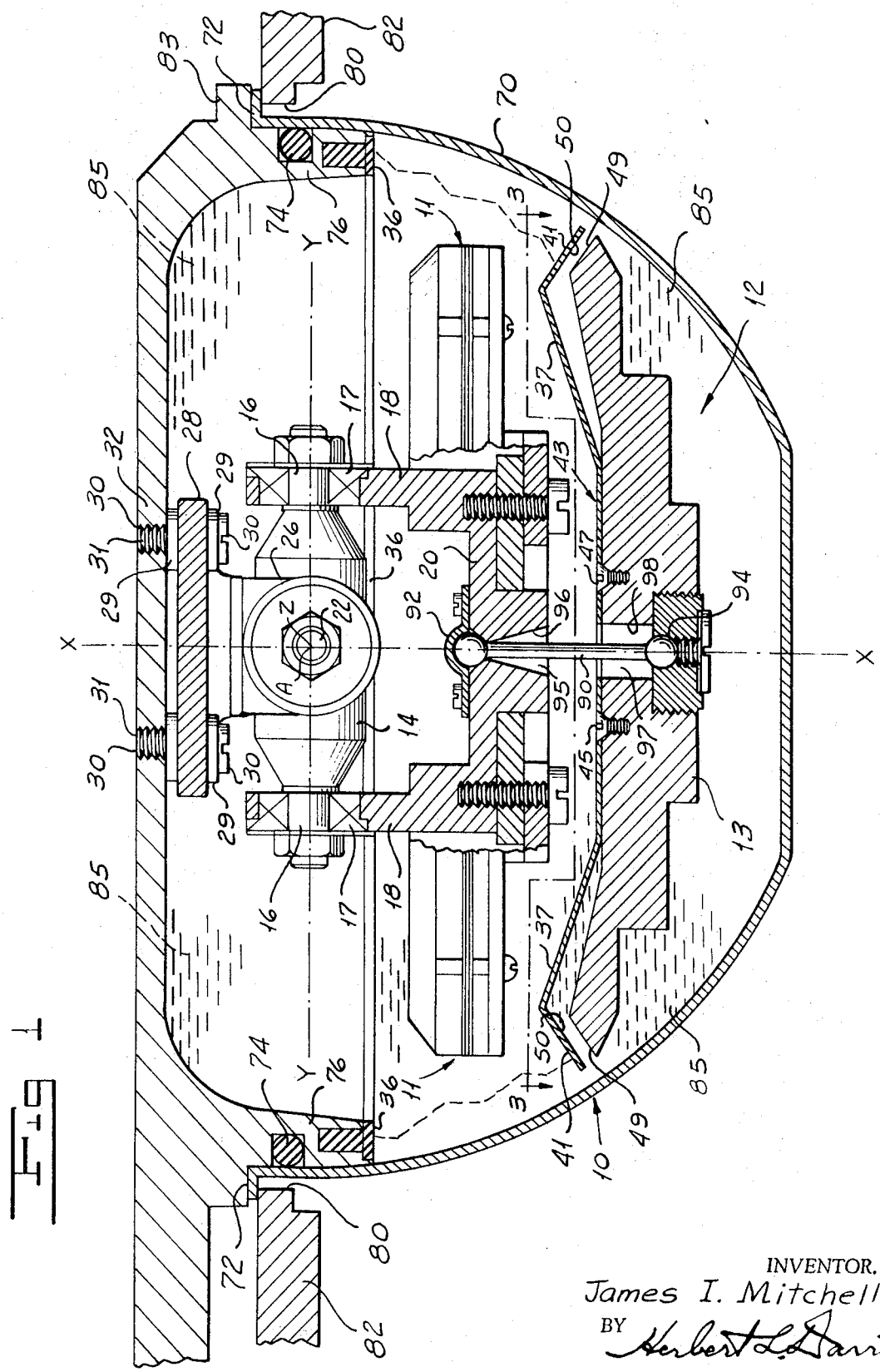

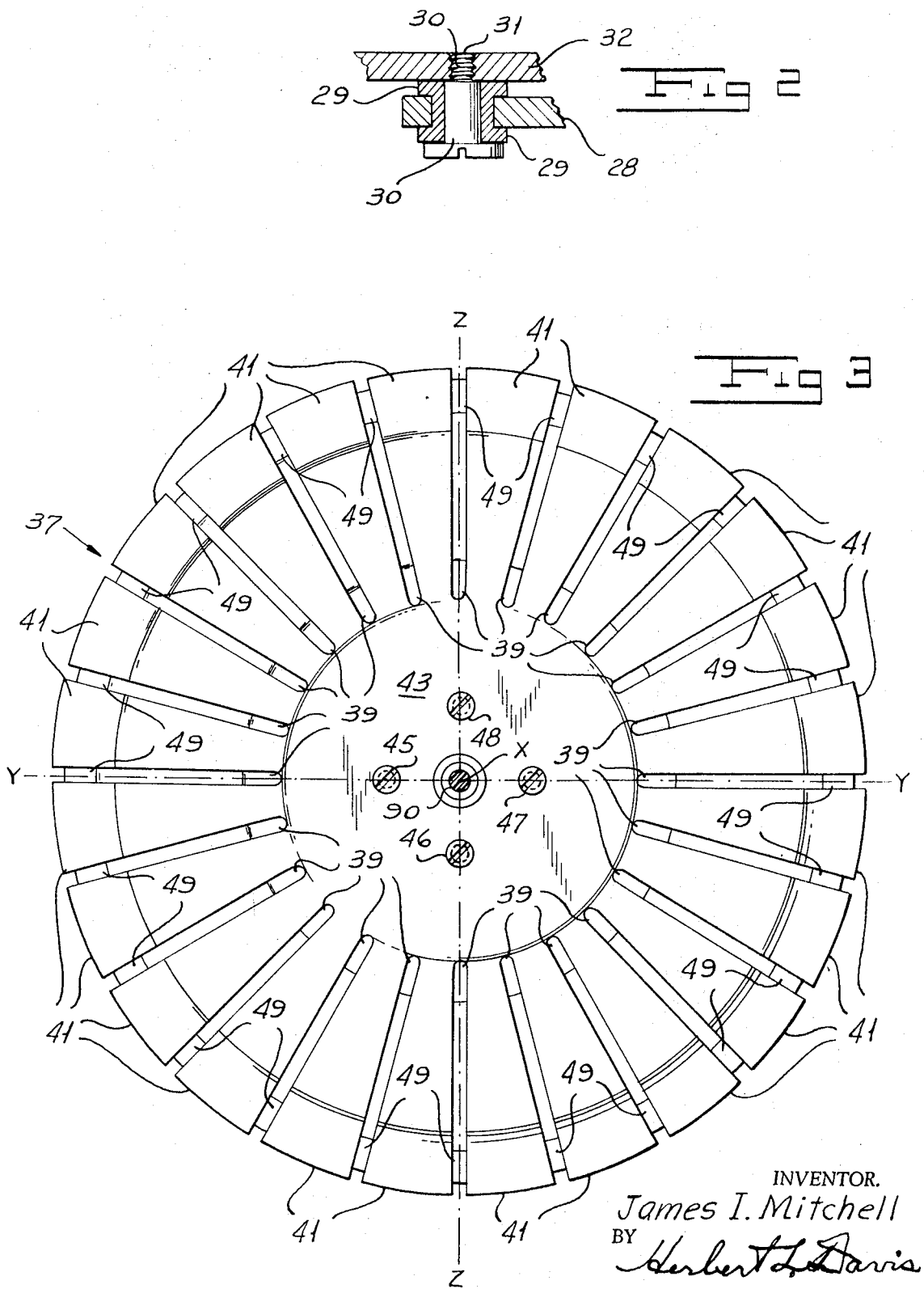

SHOCK-ABSORBING MEANS FOR A FREE PENDULOUS MAGNETIC AZIMUTH DETECTOR MECHANISM

BACKGROUND OF THE INVENTION

Field of the Invention

This invention relates to a field of shock-absorbing means and more particularly to a shock-absorbing assembly immersed in a damping liquid medium in an associated relation such that under force a desired cushioning effect is produced by the damping fluid while a spring action is effected by resilient means of the shock-absorbing assembly cooperatively arranged between the pendulous member and a base member.

Prior Art of the Invention

Heretofore there have been provided cushioning devices of a type such as disclosed in U.S. Pat. No. 2,551,505 granted May 1, 1951 to Raymond G. Olson, Jr. in which the cushioning device includes a stacked formation of metal discs and alternate rubber members carried by a base member to produce a desired cushion effect as applied, for example, to heavy operative equipment such as a shock strut of the landing gear of an airplane, the recoil absorber for guns; or a resilient support for heavy engine equipment.

In the device of the aforenoted patent, the resilient rubber inserts or spacers of the cushioning device carried by a base member provide a diametrically opposite concept from the damping liquid medium of the present invention as applied to highly sensitive aircraft flight condition responsive equipment.

There is no suggestion in the patent of an energy-absorbing assembly connected to a pendulous assembly and cooperatively arranged in relation to the base member, and immersed in a damping liquid medium, as in the present invention, so that under impact or steady force the damping liquid may act to provide a desired energy-absorbing effect, while in the arrangement of the energy-absorbing assembly of the present invention as the force is removed the spring assembly is self-restoring to its original position and shape, in a mode of operation in which the surrounding damping liquid may be drawn in to fill a void between the adjacent surfaces of segmented bumper spring elements and a cooperating surface of a weighted element of the pendulous assembly.

Furthermore in a copending U.S. Application Ser. No. 792,675 filed Jan. 21, 1969 by Benjamin J. Tirabassi, and assigned to The Bendix Corporation, there is provided a self-restoring energy-absorbing stop mounted in a base member for limiting the motion of a free pendulous magnetic azimuth detector mechanism in which the energy-absorbing stop includes a sandwich assembly of flat and wavy spring elements carried by the base member, and a distinctly different idea of means from the circular disc of spring material carried by the weighted element of the pendulous assembly, including radially extending evenly spaced cantilever spring fingers to selectively bear upon a limit stop mounted on the base member to provide an energy-absorbing means, as in the present invention.

Furthermore the prior art fails to suggest resilient grommets to mount the gimbal-magnetic field-sensing element and pendulous weight assembly on a base member, as in the present invention; nor does the prior art suggest the provision of a resilient hanger for suspending the weighted element of the pendulous assembly from the gimbal-magnetic field-sensing assembly so that the shock of the weight in hitting a casing stop may be absorbed in the resilient hanger, as in the present invention.

The present invention may embody the following features:

1. The complete gimbal-sensor-weight assembly may be mounted on resilient grommets, stiff enough for normal operation, but which would give under excessive forces when the weight hits the stops.

2. A bumper spring may be mounted on the weight and arranged to hit against the housing at the limits of motion. This bumper spring has a novel action, in that the bumper spring may consist of a thin spring-material disc, slit radially to provide many evenly spaced spring fingers for the full 360°. When the gimbal-sensor-weight assembly hits the limit stop, first one spring finger will strike the limit stop. (since the disc is tilted about a pivot there will be a point or line contact on one spring only). As motion of the assembly continues, the spring finger will depress and the adjacent fingers will come into contact. Thus shock absorbing will be gradually built up.

3. Additional shock absorbing may be obtained by suspending the weight from the gimbal-sensor assembly by means of a resilient hanger. The shock of hitting the stop would then be absorbed in the hanger. Excessive motions of the weight and the gimbal-sensor assembly would be separated so that the system is effectively floating within the limits of the resiliency of the hanger and grommet means.

The resilient hanger would be mounted on the gimbal-sensor assembly by a free-to-move ball seat, thus maintaining the pendulum effect of the weight.

One or all of these features may be used separately or in combination as required.

While no patents have been located suggesting the features (1) and (3) in the suspension of a magnetic azimuth detector signal transmitter for pendulous action; nor the provision of the radial fingers of a belleville spring as in feature (2) arranged so as to absorb shock, attention is directed to U.S. Pat. Nos. 2,902,273 granted Sept. 1, 1959 to Werner W. Hohenner; 2,941,777 granted June 21, 1960 to Paul B. Aller et al. and 3,112,950 granted Dec. 3, 1963 to Frank T. Jaskowiak.

U.S. Pat. No. 2,902,273 is of interest in showing radial spring fingers for snubbing purposes and U.S. Pat. No. 3,112,950 shows a particular segmental design for distributing pressure, but the same fail to suggest such structure in the combination in which the feature (2) is applied.

U.S. Pat. No. 3,168,252 granted Feb. 2, 1965 to Louis J. Cabernoch is also noted as of interest in showing a flexible woven wire support for a pivotally suspended device, but the same fails to suggest such structure in the combination in which feature (3) is applied. The aforenoted patents relate to a distinctly different idea of means from that of the present invention and are applied to the solution of problems which are unrelated to the art in which the present invention is applicable for use.

The device of the present invention is of that class of worthy and sustainable inventions whereby adding a new idea and a new feature in assembling older features in a given mechanism an improved result is reached with less expense.

Moreover, the present invention rests in a conception which simplifies the mechanism of the energy-absorbing stop disclosed in the aforenoted U.S. application Ser. No. 792,675, filed Jan. 21, 1969 by Benjamin J. Tirabassi and reduces the number of parts, in that the improved assemblage of the present invention, provides an energy-absorbing stop carried by the weighted element of the pendulum which is entirely immersed in a damping liquid medium of the condition responsive equipment in such an associated relation that under force, the desired cushioning effect is produced by spring members of the energy-absorbing stop through the action of the damping fluid in tending to dampen the movement of the spring members, while at the same time the resilient grommets for mounting on the base member the gimbal-magnetic field-sensing element and weighted element of the pendulum together with the resilient hanger serially connecting the weighted element of the pendulum to the magnetic field-sensing element serve to provide additional serially effective resilient means whereby the gimbal-magnetic field-sensing element-pendulous weight assembly may be separately movable from the base member and the pendulous weight assembly may be separately movable from the base member, gimbal and magnetic field-sensing element so as to further absorb in the resilient grommets and resilient hanger the shock on the weighted element in striking the casing stop so that the system is effectively floating within the limits of the resiliency of the grommets and hanger while maintaining the pendulum effect of the weighted element.

The arrangement of the present invention is such as to raise the percent of durability and certainty of operation of the spring members of the energy-absorbing stop so as to effect a condition of greater durability and one which is more sure to produce the desired result in emergency and not only with greater certainty but with less expense.

The present invention relates to a shock-absorbing means applicable to a pendulous magnetic azimuth detector mechanism or electromagnetic device which may sense the strength of the magnetic field of the earth. The sensor device may be of a conventional three-legged core and coil assembly type suspended on bearings of a gimbal structure so that the assembly may be maintained level during pitch and roll of an aircraft carrying the device in flight. The sensor device then may effectively transmit electrical signals corresponding to a difference in heading of the aircraft from a prealigned magnetic north.

The conventional sensor assembly may include a weighted element so arranged as to provide a pendulous action on the sensor device suspended on the bearings of the gimbal structure to maintain the sensor device level by the action of gravity while the complete assembly is immersed in a suitable viscous damping fluid to dampen oscillations of the sensor device.

The operating conditions of future aircraft call for rougher vibrational flight conditions than that in which the current units have been required to operate, while the extremely high speeds of such aircraft in flight may cause accelerational forces to deflect the weighted element of the pendulum with such force as to damage the sensor unit.

A problem may arise then under extremely violent vibrational operating conditions and flight maneuvers of the aircraft carrying the magnetic detector mechanism in that the gimbal-sensor-pendulous assembly of the prior art device of a type disclosed in the U.S. application Ser. No. 792,675 filed Jan. 21, 1969 by Benjamin J. Tirabassi may strike against the energy-absorbing stop or sandwich-type spring assembly disclosed therein and which due to the violence of the operating conditions may be ineffective in absorbing the resulting shock causing damage to the bearings of the gimbals due to the pendulous action of the weighted element as well as to the internal wiring of the highly sensitive earth magnetic field-sensing electromagnetic device suspended in the gimbal bearings and thereby impair the operational accuracy as well as reduce the operating life of such pendulous magnetic azimuth detector mechanism.

The present invention resides in a recognition that in such a free pendulous magnetic azimuth detector mechanism it is desirable in addition to limiting angular movement of the detector mechanism by a shock-absorbing means, to further provide serially connected resilient means so arranged that excessive motions of the weighted elements of the pendulum may be separated from the magnetic field-sensing element and gimbal, while the gimbal, magnetic field-sensing element, and weighted pendulum element may be separated from the base member upon such exceedingly excessive motions so that the system is effectively floating within the resiliency of the serially connected resilient means. This in turn serves to provide a compact shock absorber assemblage having the immediate recoverability characteristics of the present invention so needed in a highly sensitive magnetic azimuth detector mechanism responsive to flight conditions of an aircraft. There is further provided in the invention the concept of an idea of means for the implementation of a compact energy-absorbing stop assembly having complete recoverability under the extremely violent and high-frequency-impact operating conditions that may be encountered by such a free pendulous mechanism under the contemplated aircraft flight conditions through the provision in a damping liquid for the azimuth detector mechanism of a bumper spring carried by the weighted element having radially extending spring members which are totally immersed in the damping liquid so that the damping liquid may be forced between and intermediate the respective radially extending spring members and a cooperating surface of the weighted element to provide the desired damping action under applied impact forces, while the displacement volume of the energy-absorbing stop may be substantially reduced to that of the compact assemblage of the radial spring members arranged to selectively strike a contact surface on the base member to effect a gradual shock-absorbing buildup while providing the required immediate recoverability characteristics.

The shock-absorbing stop of the aforenoted copending U.S. Application Ser. No. 792,675 fails to suggest the simplified arrangement of the present invention, particularly in the provision of the radially extending spring members carried by the weighted element of the pendulum and immersed in a damping liquid medium so that as the energy-absorbing assembly is compressed under impact or steady force, the spring members are selectively compressed relative to a cooperating surface of the weighted member causing the damping liquid in which the assembly is immersed to be forced out from between adjacent surfaces of the radially extending spring members and weighted member in an action in which the movement of the damping liquid from between the respective spring members provides the desired damping effect. Further as the applied force is removed the spring assembly is self-restoring to its original position and shape in an action in which the surrounding damping liquid is drawn in between the respective spring members to fill the void between the several spring members formed by the resulting restoration in the shape and operative relation of the respective spring members to effect a rapid rate of recoverability of the respective spring members to the preceding operative condition. This action then permits an immediate reapplication of the impact forces, while preserving all of the preceding damping characteristics available in the system so that relatively high frequency recoverability is obtainable depending on the particular configuration and operative association of the spring assembly carried by the weighted element and damping liquid.

SUMMARY OF THE INVENTION

The present invention relates to a simplified means for effecting a shock-absorbing means, including novel means of incorporating viscous damping and rapid spring return in a low-volume compact package assemblage with high energy-absorbing characteristics.

An object of the invention is to provide a resilient shock-absorbing means, particularly adapted to limit the motion of a free pendulous mechanism, including a compact assemblage of radially extending spring elements concentrically affixed to a weighted element of the pendulous mechanism and immersed in a viscous damping liquid medium to provide complete recoverability under high frequency impact and incorporating the damping liquid medium integrally with the spring elements and intermediate surface thereof and a cooperating surface of the weighted element so as to reduce the displacement volume to that of the compact spring assemblage as well as reduce oscillations of the free pendulous mechanism immersed in the damping liquid.

Another object of the invention is to provide in such a free pendulous electromagnetic azimuth detector mechanism applied to an aircraft, a compact spring assemblage of a circular disc including radially extending spring fingers arranged in concentric relation to the weighted element of the free pendulous mechanism so as to contact a surface of an annular stop carried by a base member to limit angular motion of the pendulous mechanism about perpendicular pitch and bank axes of the aircraft in an arrangement in which first one spring member will bear upon the annular stop and be depressed and as the position of the pendulous mechanism continues to be angularly adjusted in said sense other radially extending spring members will be selectively brought into effective contacting relation with the surface of the stop so as to provide a gradual shock-absorbing buildup.

Another object of the invention is to provide an improved energy-absorbing assembly including in such a pendulous mechanism a weighted element having radially extending spring fingers immersed in a damping liquid medium and so arranged as to be selectively actuated so as to obtain a predetermined spring rate and effective damping action in a compact energy-absorbing stop having a rapid rate of recoverability.

A further object of the invention is to provide in such a detector mechanism a gimbal, magnetic field-sensing device and pendulous weight assembly including one or more of the following features: (1) resilient grommets to mount the assembly on a base member and which grommets may be sufficiently stiff for normal operation but which may be so arranged as to flex under excessive force as upon the pendulous weight abutting upon a surface of an annular limit stop mounted on the base member; (2) a spring disc carried by the pendulous weight and having radially extending evenly spaced spring fingers adapted to selectively bear upon the surface of the limit stop in an action in which first one spring finger may bear upon the surface of the limit stop, since the spring disc carried by the pendulous weight is tilted about a pivot of the gimbal so that there may be a point or line contact on the one spring finger only, while as the angular motion of the pendulous assembly continues toward the surface of the annular limit stop, the one spring finger will be depressed and adjacent spring fingers will in turn be brought into contacting relation with the annular limit stop causing a gradual shock-absorbing buildup; and (3) an additional shock-absorbing action may be effected by suspending the pendulous weight from the magnetic field-sensing device and gimbal by means of a resilient hanger so that the shock of the pendulous weight in hitting the surface of the limit stop may be absorbed in the resilient hanger, whereupon excessive motion of the pendulous weight and the gimbal-magnetic field-sensing device may be separated by the resilience of the hanger so as to provide a pendulous weight arrangement which is effectively floating within the limits of the resiliency of the hanger and grommets and an arrangement in which resilient hanger may be mounted on the gimbal-magnetic field-sensing device by a free-to-move ball seat so as to maintain the pendulum effect of the weight.

These and other objects and features of the invention are pointed out in the following description in terms of the embodiments thereof which are shown in the accompanying drawings.

DESCRIPTION OF THE DRAWINGS

FIG. 1 is an enlarged side view, partly in section, of a free pendulous magnetic azimuth detector mechanism embodying the present invention and including a compact shock-absorbing disc having radially extending spring fingers to abut upon a surface of an annular stop so as to limit the range of angular movement of the free pendulous mechanism about pitch and bank axes of an aircraft, as indicated by dash lines, and including a cover cap with a liquid-damping medium in which the detector mechanism is immersed to dampen oscillations thereof, as well as the action of the spring fingers, together with resilient grommets to mount a gimbal assembly of the mechanism on a base member, and a resilient hanger shown through broken-away portions to suspend the pendulous weight from a magnetic azimuth detector device carried by the gimbal assembly.

FIG. 2 is a fragmentary view of one of the resilient grommets to mount the gimbal assembly of the mechanism of FIG. 1 on a base member.

FIG. 3 is a top plan view of the shock-absorbing spring disc, taken along the lines 3-3 of FIG. 1 and looking in the direction of the arrows, so as to show the radially extending spring fingers.

DESCRIPTION OF THE INVENTION

Referring to the drawing of FIG. 1, there is indicated by the numeral 10 a free pendulous magnetic azimuth detector mechanism for use on an aircraft and which may include a magnetic field-sensing element 11 of conventional-type positioned perpendicular to an axis X-X which is kept vertical within the limits of travel of a pendulum 12 having a weighted element 13 subject to the forces of gravity.

The pendulum 12 is mounted for oscillation on a gimbal 14 by way of trunnions 16 carried in bearings 17 by arms 18 projecting from a baseplate 20 of the pendulum structure 12. The gimbal 14 is in turn mounted for oscillation on other trunnions 22 mounted in bearings carried by fixed supporting arms 26 projecting from a mounting plate 28.

GROMMET MOUNTING

The mounting plate 28 may be mounted by a plurality of resilient grommets 29 on a baseplate 32 of the detector mechanism 10. The grommets 29 are secured to the baseplate 32 by fastening bolts 30 screw threadedly engaged in suitable fastening holes 31 provided in the baseplate 32. The grommets 29 are formed of a suitable resilient plastic material sufficiently stiff to support the gimbal structure under normal operating conditions, but which material may resiliently give under excessive forces, as upon the weight 13 striking an annular stop 36 as hereinafter explained.

The pendulum structure 12 having the vertical axis X-X, as shown in FIG. 1, is mounted for oscillation about two mutually perpendicular horizontal axes, one of which Y-Y is defined by trunnions 16 normally arranged tranversely with respect to the aircraft and the other of which axes Z-Z is defined by trunnions 22 arranged parallel with the fore and aft axis of the aircraft. The trunnions 16 may be, therefore, referred to as the pitch axis and the other trunnions 22 as the bank axis of the aircraft.

Under normal flight conditions, the pendulous magnetic detector mechanism 10 serves its function in conventional manner, compensates for pitch and bank conditions of the aircraft and may include suitable electrical signal-transmitting means (not shown). The magnetic field-sensing element 11 may be of conventional type including for example a three-legged core and coil assembly (not shown) of a type well known in the art for sensing in a level position of the sensing element 11 the magnetic field of the earth and to transmit electrical signals corresponding to the difference in the heading of the aircraft from a prealigned magnetic north. Thus there is transmitted electrical signals corresponding to the detected magnetic azimuth condition of the aircraft in flight in relation to the magnetic field of the earth.

BUMPER SPRING DISC

Furthermore, mounted on the weight 13 is a bumper spring 37 in the form of a thin circular disc of a suitable resilient spring metal material slit radially at 39 to provide a plurality of radial extending evenly spaced cantilever spring fingers 41 attached concentrically at 43 by bolts 45, 46, 47 and 48 to a central portion of the weight 13. Moreover, there is provided at an outer upper annular edge surface of the weight 13 an angular bumper surface 49 extending around the weight 13 and arranged in cooperative relation with the under surface 50 of the spring fingers 41, as best shown by FIG. 1.

Thus upon angular movement of the structure 12 about the pitch axis Y-Y or about the bank axis Z-Z in excess of a predetermined range of for example 30° from the normal vertical position shown by FIG. 1, initially only one spring finger 41 strikes the stop 36 absorbing some of the energy, and as the motion of the pendulum structure 12 continues in a like sense, the adjacent spring fingers 41 are brought into action. This novel action of the bumper spring 37 provides a relatively light bumper spring action initially with a gradual buildup of bumper spring action as the motion increases.

Thus, since the spring disc 37 is tilted about the pivots provided by the trunnions 16 or 22, it will be seen that there will initially be a point or line contact on one spring finger 41 so that as the motion of the assembly so continues the spring finger 41 will depress and the adjacent fingers 41 will come into contact so that the shock-absorbing action will be gradually built up.

The spring fingers 41 of the disc 37 thus serve to limit the range of angular motion of the pendulum structure 12 of the free pendulous mechanism 10, as indicated by the dash lines of FIG. 1, about the pitch axis Y-Y, as well as about the bank axis Z-Z in like manner, as hereinafter explained.

SELF-RESTORING ENERGY-ABSORBING STOP

In the form of the invention illustrated in FIG. 1, the energy-absorbing spring disc 37 is arranged, as shown in FIGS. 1 and 3, in cooperative relation with an annular stop 36 arranged in the detector mechanism assembly 10 in concentric relation to a point A at which the vertical axis X-X, the pitch axis Y-Y and the bank axis Z-Z intersect, as indicated by FIG. 1.

Thus the annular stop surrounds in concentric relation the supporting plate 28 from which project the arms 26 carrying the bank trunnions 22. The bank trunnions 22 project from the gimbal 14 and in turn support the gimbal 14, while the pitch trunnions 16 project from the gimbal 14 perpendicular to the bank trunnions 22 and support the arms 18 projecting from the baseplate 20 of the pendulum structure 12.

Surrounding the pendulum structure 12 and arranged in space relation thereto is an inner surface of a dome-shaped cap 70 having an annular flange portion 72 held in sealing relation by a sealing ring 74 about an annular flange 76 projecting from the baseplate 32. Suitable means, not shown, may be provided to securely mount the detector mechanism 10 in operative relation in an opening 80 formed in a structural part 82 of the aircraft, while the baseplate 32 and a flange 83 projecting therefrom rests on an upper surface of the structural part 82 of the aircraft so that the azimuth detector mechanism 10 is operatively arranged for use during flight of the aircraft.

Further, the dome-shaped cap 70 may be filled through a suitable valve-controlled port, not shown, with a viscous damping liquid 85 which is sealed therein by the baseplate 32. The annular end portion 72 of the cap 70 is fastened in sealing relation by the sealing ring 74 about the annular flange 76 which project from the baseplate 32.

The damping liquid 85 which thus fills the dome-shaped cap 70 serves to dampen oscillation of the sensor 11 and pendulum structure 12 within the dome-shaped cap 70 and further provides an integral damping action on the spring fingers 41 which may be bottomed on the angular bumper surface 49 so that the energy-absorbing spring fingers 41 provides a compact package having a displacement volume corresponding to that of the space between the fingers 41 and the surface 49. This energy-absorbing assembly of the spring disc 37 is immersed in a damping liquid carried within the dome-shaped cap 70.

The arrangement is such that upon the aforenoted spring fingers 41 being compressed upon an impact or steady force being applied thereto by the stop surface 36 upon an angular movement of the pendulum structure 12 in excess of the permissible range, the spring fingers 41 are compressed and straightened between the inner surface 50 of the spring fingers 41 and the annular bumper surface 49 of the weight 13. Further the liquid 85 in which the assembly 38 is immersed is forced out from between the aforenoted adjacent surfaces of the spring fingers 41 and the weight 13.

The passage or squeezing of the damping liquid from between the aforenoted surfaces provides a damping action which may be effectively controlled by the selection of the wetted surface area of the respective surfaces and by the viscosity of the damping liquid.

However, upon the applied force being removed the energy-absorbing spring fingers 41 of the disc 37 are self-restoring to their original position and shape through the spring action of the respective spring fingers 41 so that the damping liquid 85 carried by the dome-shaped cover 70, and in which the energy-absorbing stop 38 is immersed, is effective to provide a surrounding damping liquid to be drawn in between the spring fingers and the bumper surface 49 so as to fill the void between the respective spring fingers 41 caused by the restoring action thereof.

The restoring action of the energy-absorbing spring fingers 41 in drawing the surrounding damping liquid 85 in to fill the void between the respective spring fingers 41 and the surface 49 is effected at a rapid rate and in such a manner as to allow an immediate reapplication of the impacting force to be applied to the spring fingers 41, while preserving all of the original damping effect that is available by the damping fluid 85 being drawn back in between the respective spring fingers 41 and the bumper surface 49. Relatively high frequency recoverability is then obtainable depending on the particular configuration of the self-restoring energy-absorbing springs 41 and its associated relationship with the annular bumper surface 49 on the weight 13.

RESILIENT HANGER

An additional shock-absorbing means may be provided by substituting for a conventional rigid connection between the pendulum weight 13 and the magnetic field-sensing element 11, a novel resilient hanger 90 formed of a suitable resilient flexible material.

The resilient hanger 90 is connected at one end to the magnetic field-sensing element 11 by a free-to-move ball seat assembly 92 while the opposite end of the resilient hanger 90 is connected by an adjustable fixed ball seat assembly 94 to the weight 13.

Moreover the resilient hanger 90 extends through an opening 95 in the baseplate 20 in spaced relation to side surfaces 96 defining the opening 95 and further through an opening 97 in the weight 13 in spaced relation to side surfaces 98 defining the opening 37.

The sensing element 11 and the gimbal-suspending structure is to be made as light in weight as practical so as to reduce the forces acting thereon due to acceleration and vibration.

The weight 13 to provide the pendulum effect, however, is to be hung from the magnetic field-sensing element 11 by the resilient hanger 90 so that the shock of the weight 13 and spring fingers 41 in hitting the stop 36 would then be absorbed in the resilient hanger 90. Thus excessive motions of the weight 13 and the sensing element 11 would be separated so that the system is effectively floating within the limits of the resiliency of the hanger 90 and the grommet 29, while the resilient hanger 90 serves to connect the sensing element 11 to the weight 13 by the free-to-move ball seat 92 so as to maintain the pendulum effect of the weight 13.

Thus the moment of the weight 13 about the gimbal pivots 16 and 22 would bring the magnetic field-sensing element 11 to the desired level condition under normal static operative conditions.

However under extreme vibration and accelerational conditions the sensing element 11 and weight 13 would move separately. This separate connection would reduce the blow on the bumper spring 37 and would also absorb some of the forces in the flexible member 90, so that the reaction on the gimbal structure would be reduced. Erratic motions of the sensing element 11 would be reduced and more accurate sensed information would be obtained under extreme vibration.

I claim:

1. In an aircraft instrument of a type including a pendulous member, a device for sensing a flight condition of an aircraft, the pendulous member carrying the device, means for pivotally suspending the pendulous member in a movable operative relation about pitch and bank axes of the aircraft, a base member adapted to be mounted on the aircraft, the base member carrying the pivotal suspension means in said operative relation, the pendulous member including a weight responsive to gravitational forces to normally maintain the flight condition sensing device in a level operative position under varying pitch and bank attitudes of the aircraft; the improvement comprising an energy-absorbing spring means carried by the weight for limiting angular pivotal movement of said pendulous member in excess of a predetermined angular relation about said axes, a bumper surface provided on the base member, the spring means carried by the weight being arranged in cooperative relation with the bumper surface, the spring means being arranged to contact said bumper surface upon the angular movement of the pendulous member exceeding the predetermined angular relation about one of said axes in response to said gravitational forces, and the spring means being thereupon flexed so as to effectively absorb energy applied to the pendulous member by the gravitational forces in causing angular movement of the pendulous member in excess of said predetermined angular relation.

2. In an aircraft instrument the combination defined by claim 1 in which the spring means carried by the weight includes a circular disc secured to said weight, the circular disc including radially extending spring fingers positioned in spaced relation to a surface of said weight, the spring fingers being so arranged that initially one of said spring fingers strikes the bumper surface upon pivotal movement of said pendulous member in a sense exceeding the predetermined angular relation about one of said axes in response to said gravitational forces for absorbing energy applied to the pendulous member by the gravitational forces, and other of said radially extending spring fingers adjacent to said one spring finger being selectively brought into operation by striking the bumper surface to effect a gradual buildup of a biasing force acting in opposition to the angular movement of the pendulous member in said sense so as to absorb energy applied to the pendulous member by the gravitational forces causing the angular movement of the pendulous member in excess of said predetermined angular relation.

3. In an aircraft instrument the combination defined by claim 1 in which the spring means carried by the weight includes a circular disc secured to said weight, the circular disc including radially extending spring fingers positioned in spaced relation to a surface of said weight, the spring fingers being so arranged that initially one of said spring fingers strikes the bumper surface upon pivotal movement of said pendulous member in a sense exceeding the predetermined angular relation about one of said axes in response to said gravitational forces for absorbing energy applied to the pendulous member by the gravitational forces and other of said radially extending spring fingers adjacent to said one spring finger being selectively brought into operation by striking the bumper surface to effect a gradual buildup of a biasing force acting in opposition to the angular movement of the pendulous member in said sense so as to absorb energy applied to the pendulous member by the gravitational forces causing the angular movement of the pendulous member in excess of said predetermined angular relation, a cover cap enclosing the pendulous member and mounted on the base member, the cap having an inner surface arranged in spaced relation to the pendulous member so as to permit the angular movement thereof, and a viscous fluid medium within the cover cap for damping the movement of the pendulous member within the cover cap, the spring fingers being immersed in the viscous fluid medium so that upon any one of said spring fingers being compressed so as to flex in a sense toward the surface of said weight, the fluid medium may be forced out from between said one spring finger and the surface of said weight to provide a damping action, while upon the force effecting the compression of said one spring finger being removed said one spring finger may flex in an opposite sense to effect a drawing in of the fluid medium to fill a void thereupon provided between said spring finger and the surface of the weight so that thereafter a reapplication of the force to said spring finger may be subject to the initial damping action due to the recoverability of the damping fluid between said spring finger.

4. In an aircraft instrument the combination defined by claim 1 including a cover cap surrounding the pendulous member and projecting from the base member, the cover cap having an inner surface in space relation to the pendulous member so as to permit the angular movement of the pendulous member within the cover cap, the cover cap carrying a viscous fluid medium for damping movement of the pendulous member within the cover cap, and the spring means including spring members immersed in the viscous fluid medium and extending radially from the weight in spaced relation to a surface of the weight so that upon any one of the spring members being flexed toward the surface of the weight so as to effectively absorb the energy applied to the pendulous member by the gravitational forces the damping fluid in which the spring members are immersed may be effectively forced out from between said one spring member and surface providing a damping action on the spring member, while upon the force applied by the pendulous member being removed said spring member is self-restoring to the original position drawing in the surrounding fluid medium in fill a void between the spring member and surface to provide a rapid rate of recoverability which then permits an immediate reapplication of the compressive force subject to the preceding damping action provided by the action of the viscous fluid medium on the spring members of the spring means immersed therein.

5. In an aircraft instrument the combination defined by claim 1 in which the spring means includes a plurality of alternate flat spring fingers projecting radially from the weight, the base member including an annular stop positioned in concentric relation to a point of intersection of the pitch and bank axes of the aircraft about which the pendulous member is pivotally suspended, the spring fingers projecting radially from the weight in concentric relation thereto, and said annular stop being so positioned as to selectively contact said spring fingers to compress the spring fingers upon the angular movement of the pendulous member exceeding the predetermined angular relation about one of said axes in response to said gravitational forces so as to effectively absorb the energy applied thereto by the pendulous member.

6. In an aircraft instrument the combination defined by claim 1 in which the spring means includes a plurality of alternate flat spring fingers projecting radially from the weight, the base member including an annular stop positioned in concentric relation to a point of intersection of the pitch and bank axes of the aircraft about which the pendulous member is pivotally suspended, the spring fingers projecting radially from the weight in spaced relation to a surface of the weight and extending radially from said point of intersection, and said annular stop being so positioned as to selectively contact said spring fingers to compress the spring fingers upon the angular movement of the pendulous member exceeding the predetermined angular relation about one of said axes in response to said gravitational forces so as to effectively absorb the energy applied thereto by the pendulous member, and a cover cap projecting from the base member and enclosing therein the pendulous member, the cover cap having an inner surface arranged in spaced relation to the pendulous member so as to permit the angular movement thereof within the cover cap, a viscous damping liquid carried within the cover cap for damping the movement of the pendulous member within the cover cap, and the spring fingers being immersed within the damping liquid so that upon any of the spring fingers being selectively compressed by contacting the annular stop a viscous damping liquid in which the flat spring members may be immersed may be effectively forced out from between adjacent surfaces of the compressed flat spring finger and the weight so as to dampen movement of said compressed spring finger, and as the force applied by the angular movement of the pendulous member upon said spring finger being removed, the spring finger may effect a self-restoring action returning the spring finger to an original position and shape and effect a drawing in of the surrounding damping viscous liquid medium to fill a resultant void provided between the spring finger and the surface of the weight at a relatively rapid rate of recoverability so as to permit an immediate reapplication of a compressive force by the pendulous member, while preserving the original damping characteristics of the energy-absorbing spring means.

7. The combination defined by claim 1 including a resilient element connecting the weight of the pendulous member to the device carried by the pendulous member for sensing the flight condition of the aircraft and to permit the weight to move separately from the sensing device under extreme vibration and accelerational forces so as to reduce forces applied to the spring means by absorbing some of such forces in the resilient element.

8. The combination defined by claim 1 including resilient grommet means for connecting the base member to the pivotal suspension means in said operative relation and to permit the pivotal suspension means carried by the base member to move separately from the base member under extreme vibration and accelerational forces so as to reduce forces applied to the spring means by absorbing some of such forces in the resilient grommet means.

9. The combination defined by claim 1 including a resilient grommet means for connecting the base member to the pivotal suspension means in said operative relation and to permit the pivotal suspension means carried by the base member to move separately from the base member under extreme vibration and accelerational forces so as to reduce forces applied to the spring means by absorbing some of such forces in the resilient grommet means, and a resilient element connecting the weight of the pendulous member to the device carried by the pendulous member for sensing the flight condition of the aircraft and to permit the weight to move separately from the sensing device under extreme vibration and accelerational forces so as to reduce forces applied to the spring means by absorbing some of such forces in the resilient element.

10. In an aircraft instrument of a type including a pendulous member, a device for sensing a flight condition of an aircraft, the pendulous member carrying the device, means for pivotally suspending the pendulous member in a movable operative relation about pitch and bank axes of the aircraft, a base member adapted to be mounted on the aircraft, the base member carrying the pivotal suspension means in said operative relation, the pendulous member including a weight responsive to gravitational forces to normally maintain the flight condition sensing device in a level operative position under varying pitch and bank attitudes of the aircraft; the improvement comprising a resilient element connecting the weight of the pendulous member to the device carried by the pendulous member for sensing the flight condition of the aircraft and to permit the weight to move separately from the sensing device under extreme vibration and accelerational forces so as to absorb some of such forces in the resilient element, and a free-to-move ball seat means connecting the resilient element at one end to the device for sensing the flight condition of the aircraft so as to maintain the effect of the weight on the device carried by the pendulous member.

11. The combination defined by claimed 10 including resilient grommet means for connecting the base member to the pivotal suspension means in said operative relation and to permit the pivotal suspension means carried by the base member to move separately from the base member under extreme vibration and accelerational forces so as to absorb some of such forces in the resilient grommet means.

12. In an aircraft instrument of a type including a pendulous member, a device for sensing a flight condition of an aircraft, the pendulous member carrying the device, means for pivotally suspending the pendulous member in a movable operative relation about pitch and bank axes of the aircraft, a base member adapted to be mounted on the aircraft, the base member carrying the pivotal suspension means in said operative relation, the pendulous member including a weight responsive to gravitational forces to normally maintain the flight condition sensing device in a level operative position under varying pitch and bank attitudes of the aircraft, and stop means for limiting movement of the pendulous member at extreme operative relations about said axes; the improvement comprising resilient grommet means for connecting the base member to the pivotal suspension means in said operative relation and to permit the pivotal suspension means carried by the base member to move separately from the base member upon said pendulous member striking said stop means under extreme vibration and accelerational forces so as to absorb some of such forces in the resilient grommet means.

13. The combination defined by claim 12 including a resilient element connecting the weight of the pendulous member to the sensing device carried by the pendulous member and to permit the weight to move separately from the sensing device under extreme vibration and accelerational forces, and said weight including means to strike said stop means for limiting the movement of the pendulous member at said extreme operative relations about said axes, the resilient element and the resilient grommet means being serially arranged so as to absorb under the extreme vibration and accelerational forces some of such forces in the resilient element and grommet means.